(12) United States Patent
Wang et al.

(10) Patent No.: US 11,948,287 B2
(45) Date of Patent: Apr. 2, 2024

(54) IMAGE PROCESSING METHOD AND SYSTEM

(71) Applicant: CONTEMPORARY AMPEREX TECHNOLOGY CO., LIMITED, Fujian (CN)

(72) Inventors: Zhiyu Wang, Fujian (CN); Qiangwei Huang, Fujian (CN); Boxiong Huang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/140,642

(22) Filed: Apr. 28, 2023

(65) Prior Publication Data

US 2023/0267586 A1 Aug. 24, 2023

Related U.S. Application Data

(63) Continuation of application No. PCT/CN2021/136054, filed on Dec. 7, 2021.

(51) Int. Cl.
*G06K 9/00* (2022.01)
*G06T 5/50* (2006.01)
(Continued)

(52) U.S. Cl.
CPC ............ *G06T 5/50* (2013.01); *G06V 10/7715* (2022.01); *G06V 10/7784* (2022.01);
(Continued)

(58) Field of Classification Search
CPC ............ G06T 5/50; G06T 2207/10016; G06T 2207/20081; G06T 2207/20084;
(Continued)

(56) References Cited

U.S. PATENT DOCUMENTS

2021/0065336 A1    3/2021   Ocampo et al.

FOREIGN PATENT DOCUMENTS

| CN | 103308452 A | 9/2013 |
| CN | 104182952 A | 12/2014 |

(Continued)

OTHER PUBLICATIONS

Sun, Jianguo, et al. "A multi-focus image fusion algorithm in 5G communications." Multimedia Tools and Applications 78 (2019): 28537-28556. (Year: 2019).*
International Search Report and Written Opinion dated Sep. 7, 2022, received for PCT Application PCT/CN2021/136054, filed on Dec. 7, 2021, 15 pages including English Translation.
(Continued)

*Primary Examiner* — Jonathan S Lee
(74) *Attorney, Agent, or Firm* — XSENSUS LLP

(57) ABSTRACT

The present application relates to an image processing method and system. The method may include: acquiring a sequence of input images containing a target object; and performing multi-resolution fusion on the sequence of input images to generate a single fused image, where pixels of the fused image may include a pixel at a corresponding position of an input image in the sequence of input images, and each pixel of the fused image containing the target object may include a pixel at a corresponding position of an input image in the sequence of input images in which part of the target object is focused.

13 Claims, 5 Drawing Sheets

(51) Int. Cl.
- *G06V 10/77* (2022.01)
- *G06V 10/778* (2022.01)
- *G06V 20/70* (2022.01)
- *H04N 5/262* (2006.01)
- *H04N 5/265* (2006.01)

(52) U.S. Cl.
CPC ........... *G06V 20/70* (2022.01); *H04N 5/2628* (2013.01); *H04N 5/265* (2013.01); *G06T 2207/10016* (2013.01); *G06T 2207/20081* (2013.01); *G06T 2207/20084* (2013.01); *G06T 2207/20221* (2013.01)

(58) Field of Classification Search
CPC .......... G06T 2207/20221; G06V 20/70; G06V 10/7715; G06V 10/7784; H04N 5/2628; H04N 5/265
USPC ........................................................ 382/159
See application file for complete search history.

(56) References Cited

FOREIGN PATENT DOCUMENTS

| | | |
|---|---|---|
| CN | 110334779 A | 10/2019 |
| CN | 110533623 A | 12/2019 |
| CN | 112241940 A | 1/2021 |
| CN | 113012174 A | 6/2021 |

OTHER PUBLICATIONS

Shah Ariful Hoque Chowdhury et al: "Fixed-Lens camera setup and calibrated image registration for multifocus multiview 3D reconstruction", Neural Computing and Applications, Springer London, London, vol. 33, No. 13, Apr. 6, 2021 (Apr. 6, 2021), pp. 7421-7440.

Bin Xiao et al: "Global-Feature Encoding U-Net (GEU-Net) for Multi-Focus Image Fusion", IEEE Transactions On Image Processing, IEEE, USA, vol. 30, Oct. 28, 2020 (Oct. 28, 2020), pp. 163-175.

Wencheng Wang et al: "A Multi-focus Image Fusion Method Based on Laplacian Pyramid", Journal of Computers, vol. 6, No. 12, Dec. 1, 2011 (Dec. 1, 2011).

Extended European Search Report dated Dec. 21, 2023 in European Patent Application No. 21960096.2.

* cited by examiner

IMAGE PROCESSING METHOD AND SYSTEM

CROSS-REFERENCE TO RELATED APPLICATION

The present application is a continuation of International Application No. PCT/CN2021/136054, filed Dec. 7, 2021, which is incorporated herein by reference in its entirety.

TECHNICAL FIELD

The present application relates to computer technology, and in particular, to image processing technology.

BACKGROUND ART

The use of computers for image processing is widely implemented in various fields. Image processing can be used to improve a visual quality of an image, extract features of a specific target in an image, store and transmit an image, fuse a sequence of images, etc. During photographing of a target object, it is often necessary to photograph a sequence of images with different focuses, to capture the target object. In such cases, it is desirable to perform fusion on the sequence of photographed images for subsequent image processing.

To this end, an improved technique for image fusion is needed.

SUMMARY OF THE DISCLOSURE

In view of the above problems, the present application provides an image processing method and system that can provide a fused image in which each pixel of a target object is focused.

In a first aspect, the present application provides an image processing method, including: acquiring a sequence of input images containing a target object; and performing multi-resolution fusion on the sequence of input images to generate a single fused image, where pixels of the fused image include a pixel at a corresponding position of an input image in the sequence of input images, and each pixel of the fused image containing the target object includes a pixel at a corresponding position of an input image in the sequence of input images in which part of the target object is focused.

In the technical solution of the embodiments of the present application, the indexes of the sequence of input images in which each pixel point of the target object is focused are learned, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

In some embodiments, the acquiring a sequence of input images further includes: setting a step size of a camera for acquiring the sequence of input images based on a number of frames of the sequence of input images and a size of the target object in the sequence of input images. The step size of the camera is set based on the size of the target object and the number of the frames of the sequence of input images, which can ensure that the acquired sequence of input images can cover all focused regions of the target object, thereby ensuring that each pixel of the target object in the fused image includes a focused portion.

In some embodiments, the sequence of input images contains indexes, and the performing multi-resolution fusion on the sequence of input images to generate a fused image further includes: extracting features of the sequence of input images; performing multi-resolution fusion on the extracted features, to obtain fused multi-resolution features; generating a predicted mask map based on the fused multi-resolution features, where each pixel of the predicted mask map indicates an index of an input image, and the index indicates an input image from which each pixel of the fused image originates; and generating the fused image based on the predicted mask map and the sequence of input images. By means of semantic segmentation, the images in which the target object is the clearest are found from a sequence of multi-frame images and then fused, so that a deep learning semantic segmentation neural network learns relative position information (i.e. the indexes of the sequence of input images) of each clear pixel point through internal convolution, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

In some embodiments, the method further includes: applying a 2D fusion algorithm to the sequence of input images to generate an initial fused image; and receiving a ground truth annotation of the initial fused image to generate an annotated mask map, where the annotated mask map indicates whether one or more pixels of the target object in the initial fused image are focused. The part of the initial fused image where the target object is still blurred (unfocused) is annotated and masked by means of semi-automatic annotation, and is then removed from a training sample set, to obtain a real training data set that contains only ground truth annotations of the focused pixels, such that a large amount of task-related training data can be rapidly generated, and a semantic segmentation model can be trained using real and valid production line data. In the solution of the present application, for different production lines, only some pieces of real and valid data need to be collected for fine-tuning training, and can then be mass-reproduced and spread to these different production lines, such that actual requirements can be covered and the technique is implemented into the practical application of the production lines.

In some embodiments, the method further includes: calculating a loss rate between the predicted mask map and the annotated mask map; and feeding back the calculated loss rate to a multi-resolution fusion algorithm for performing the multi-resolution fusion. The loss rate between the predicted mask map and/or fused image output by the multi-resolution fusion algorithm and the mask map annotated by ground truth reflects a similarity between the predicted mask map and/or fused image output by the multi-resolution fusion algorithm and an original input image. The loss rate is fed back to the multi-resolution fusion algorithm, and supervised learning training is performed on the output of the multi-resolution fusion algorithm based on the loss rate together with the mask map annotated by ground truth, such that the accuracy of the multi-resolution fusion algorithm in terms of generating a fused image in which all target objects are clear is improved through continuous training and learning while achieving fitting regression in training.

In some embodiments, the method further includes: updating the multi-resolution fusion algorithm for performing the multi-resolution fusion based on the loss rate, or the annotated mask map, or a combination of the two. The calculated loss rate is fed back to the multi-resolution fusion algorithm along with the mask map annotated by ground truth, and supervised learning training is performed on the output of the multi-resolution fusion algorithm, such that the accuracy of the multi-resolution fusion algorithm in terms of generating a fused image in which all target objects are clear is improved through continuous training and learning while achieving fitting regression in training.

In a second aspect, the present application provides an image processing system, including: an acquisition module configured to acquire a sequence of input images containing a target object; and a fusion module or circuitry configured to perform multi-resolution fusion on the sequence of input images to generate a single fused image, where pixels of the fused image include a pixel at a corresponding position of an input image in the sequence of input images, and each pixel of the fused image containing the target object includes a pixel at a corresponding position of an input image in the sequence of input images in which part of the target object is focused.

In the technical solution of the embodiments of the present application, the indexes of the sequence of input images in which each pixel point of the target object is focused are learned, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

In some embodiments, the acquisition module is further configured to set a step size of a camera for acquiring the sequence of input images based on a number of frames of the sequence of input images and a size of the target object in the sequence of input images. The step size of the camera is set based on the size of the target object and the number of the frames of the sequence of input images, which can ensure that the acquired sequence of input images can cover all focused regions of the target object, thereby ensuring that each pixel of the target object in the fused image includes a focused portion.

In some embodiments, the sequence of input images contains indexes, and the fusion module further includes: an encoder configured to: extract features of the sequence of input images; and perform multi-resolution fusion on the extracted features, to obtain fused multi-resolution features; and a decoder configured to: generate a predicted mask map based on the fused multi-resolution features, where each pixel of the predicted mask map indicates an index of an input image, and the index indicates an input image from which each pixel of the fused image originates. Starting from the structure of a semantic segmentation neural network, the multi-resolution fusion method of the present application proposes an end-to-end deep learning-based adaptive multi-focus fusion solution. In the present application, depth features of the sequence of images are extracted by the model encoder part, and are then fused to generate the fused image by the decoder, so that the deep learning semantic segmentation neural network can learn relative position information (i.e. the indexes of the sequence of input images) of each clear pixel point through internal convolution, thereby reducing the dependence of a traditional algorithm on a threshold by using a deep model, and enhancing fusion robustness.

In some embodiments, the fusion module is further configured to generate the fused image based on the predicted mask map and the sequence of input images. By means of semantic segmentation, the images in which the target object is the clearest are found from a sequence of multi-frame images and then fused, so that a deep learning semantic segmentation neural network learns relative position information (i.e. the indexes of the sequence of input images) of each clear pixel point through internal convolution, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

In some embodiments, the system further includes: an initial fusion module or circuitry configured to apply a 2D fusion algorithm to the sequence of input images to generate an initial fused image; and an annotation receiving module or circuitry configured to receive a ground truth annotation of the initial fused image to generate an annotated mask map, where the annotated mask map indicates whether one or more pixels of the target object in the initial fused image are focused. The part of the initial fused image where the target object is still blurred (unfocused) is annotated and masked by means of semi-automatic annotation, and is then removed from a training sample set, to obtain a real training data set that contains only ground truth annotations of the focused pixels, such that a large amount of task-related training data can be rapidly generated, and a semantic segmentation model can be trained using real and valid production line data. In the solution of the present application, for different production lines, only some pieces of real and valid data need to be collected for fine-tuning training, and can then be mass-reproduced and spread to these different production lines, such that actual requirements can be covered and the technique is implemented into the practical application of the production lines.

In some embodiments, the system further includes: a loss rate module or circuitry configured to: calculate a loss rate between the predicted mask map and the annotated mask map; and feed back the calculated loss rate to the fusion module. The loss rate between the predicted mask map and/or fused image output by the multi-resolution fusion algorithm and the mask map annotated by ground truth reflects a similarity between the predicted mask map and/or fused image output by the multi-resolution fusion algorithm and an original input image. The loss rate is fed back to the multi-resolution fusion algorithm, and supervised learning training is performed on the output of the multi-resolution fusion algorithm based on the loss rate together with the mask map annotated by ground truth, such that the accuracy of the multi-resolution fusion algorithm in terms of generating a fused image in which all target objects are clear is improved through continuous training and learning while achieving fitting regression in training.

In some embodiments, the fusion module is further configured to update the fusion module based on the loss rate, or the annotated mask map, or a combination of the two. The calculated loss rate is fed back to the multi-resolution fusion algorithm along with the mask map annotated by ground truth, and supervised learning training is performed on the output of the multi-resolution fusion algorithm, such that the accuracy of the multi-resolution fusion algorithm in terms of generating a fused image in which all target objects are clear is improved through continuous training and learning while achieving fitting regression in training.

In a third aspect, the present application provides an image processing system, including: a memory having computer-executable instructions stored thereon; and a processor coupled to the memory, where the computer-executable instructions cause the system to perform the following operations when executed by the processor: acquiring a sequence of input images containing a target object; and performing multi-resolution fusion on the sequence of input images to generate a single fused image, where pixels of the fused image include a pixel at a corresponding position of an input image in the sequence of input images, and each pixel of the fused image containing the target object includes a pixel at a corresponding position of an input image in the sequence of input images in which part of the target object is focused.

In the technical solution of the embodiments of the present application, the indexes of the sequence of input images in which each pixel point of the target object is focused are learned, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

The above description is only an overview of the technical solution of the present application. In order to more clearly understand the technical means of the present application to implement same according to the contents of the specification, and in order to make the aforementioned and other objects, features and advantages of the present application more obvious and understandable, specific embodiments of the present application are exemplarily described below.

BRIEF DESCRIPTION OF THE DRAWINGS

Various other advantages and benefits will become apparent to those of ordinary skill in the art upon reading the following detailed description of preferred embodiments. The drawings are merely for the purpose of illustrating the preferred embodiments and are not to be construed as limiting the present application. Moreover, like components are denoted by like reference numerals throughout the drawings. In the drawings.

DETAILED DESCRIPTION OF EMBODIMENTS

Figure 1:
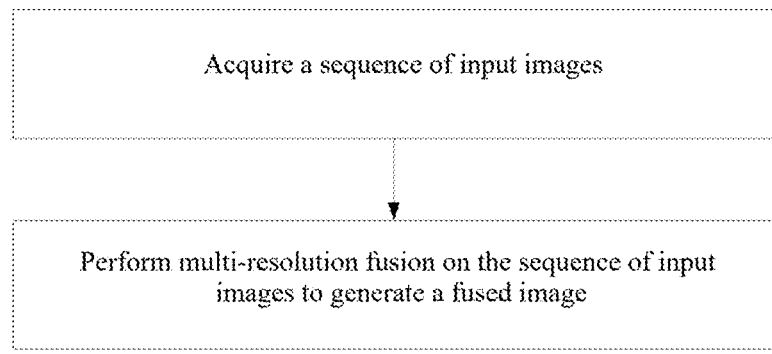
FIG. 1 is a flowchart of an image processing method according to some embodiments of the present application.

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "/" herein generally indicates an "or" relationship between the associated objects.

The use of computers for image processing is widely implemented in various fields. Image processing can be used to improve a visual quality of an image, extract features of a specific target in an image, store and transmit an image, fuse a sequence of images, etc. During photographing of a target object, it is often necessary to photograph a sequence of images with different focuses, to capture the target object. In such cases, it is desirable to perform fusion on the sequence of photographed images for subsequent image processing.

During the production of power lithium batteries, defects are inevitable due to processes and equipments. Throughout all links of the production line, it is a crucial part to detect whether tabs of lithium batteries are folded, and the validity of a detection result thereof ensures the safety of the batteries leaving a factory. For example, in a case of photographing images of the lithium batteries produced on the production line and performing defect detection on target objects, such as tabs, in the images, all electrode plates cannot be focused at the same time because a camera lens is limited by a depth of field. Consequently, some of the electrode plates are often clear and some are blurred in the photographed pictures. As a result, it is often impossible that an image in which all the electrode plates of the tabs are clear is obtained by photographing only a single picture. In practice, a plurality of images with different focused regions are often photographed in a same scene, and are then fused into one image for subsequent defect detection.

Some image fusion methods include, for example, using a deconvolution network with low-pass and high-pass filters to extract low-frequency and high-frequency information of a source image, to implement image fusion. Since network middle-layer information is not fully used in such methods, the fused image obtained based on the inferred fused feature map and convolution summation often loses original information of some different images in a sequence of source images that clearly focus on. Some other image fusion methods include performing Gaussian blurring on different regions of a tagged image as training data. Since the training data does not come from a real production line, such methods are difficult to simulate and cover actual requirements, and are thus less practical.

In view of the above problems, the present application provides an image processing technique capable of providing a fused image in which each pixel of a target object is focused. The image processing method of the present application includes: acquiring a sequence of input images containing a target object; and performing multi-resolution fusion on the sequence of input images to generate a single fused image, where pixels of the fused image include a pixel at a corresponding position of an input image in the sequence of input images, and each pixel of the fused image containing the target object includes a pixel at a corresponding position of an input image in the sequence of input images in which part of the target object is focused.

Starting from the structure of a semantic segmentation neural network, the solution of the present application proposes an end-to-end deep learning-based adaptive multi-focus fusion solution. In the present application, depth features of the sequence of images are extracted by the model encoder part, and are then fused to generate the fused image by the decoder, so that the deep learning semantic segmentation neural network can learn relative position information (i.e. the indexes of the sequence of input images) of each clear pixel point through internal convolution; and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, effectively improving the utilization rate of image information, reducing the dependence of a traditional algorithm on a threshold by using a deep model, and enhancing fusion robustness.

The technical solution of the embodiments of the present application is applied to a case where fusion is performed on the sequence of input images and a high resolution is required for each pixel of the target object in the fused image, including, but not limited to, obtaining an all-in-focus fused image of components, such as tabs, in a lithium battery, obtaining an all-in-focus fused image of virus cells in the field of medicine, obtaining an all-in-focus fused image of target facilities or point positions in the field of military, and cases where fusion is performed on the sequence of input images and a high resolution is required for each pixel of the target object in the fused image in any other applicable scenes.

Referring to FIG. 1, FIG. 1 is a flowchart of an image processing method according to some embodiments of the present application. The present application provides an image processing method. As shown in FIG. 1, the method includes: in step 105, acquiring a sequence of input images containing a target object; and in step 110, performing multi-resolution fusion on the sequence of input images to generate a single fused image, where pixels of the fused image include a pixel at a corresponding position of an input image in the sequence of input images, and each pixel of the fused image containing the target object includes a pixel at a corresponding position of an input image in the sequence of input images in which part of the target object is focused.

In some examples, the sequence of input images may include a series of images photographed in the same scene by focusing on different parts of the target object, such as a sequence of images in which different electrode plates of tabs are focused in the same scene. Each image in the sequence of images has a corresponding index, such as an image 1, an image 2, . . . , and an image k. In some examples, performing multi-resolution fusion on the sequence of input images to generate a fused image may include inputting the sequence of input images (e.g., the image 1, the image 2, . . . , and the image k) into a fusion module that performs a multi-resolution fusion algorithm, to generate a fused image (e.g., an image k+1) containing each single image. In some examples, the multi-resolution fusion algorithm is an algorithm that can be implemented by a deep learning semantic segmentation neural network, through which algorithm indexes of a sequence of images in which each pixel of the target object in the sequence of input images is focused are learned, values in the pixels corresponding to the indexes of the sequence of images are extracted, and multi-resolution pixel-level fusion is performed, so that a fused image in which each pixel of the target object is focused is generated. For example, the multi-resolution fusion algorithm learns that a pixel in row i and column j of the input image (the pixel for presenting the target object) is focused in an image 2 in a sequence of images 1-k, and a pixel in row i and column j+1 of the input image is focused in an image k in a sequence of images 1-k. Therefore, an image index value of 2 can be obtained for the pixel in row i and column j, an image index value of k can be obtained for the pixel in row i and column j+1, and so on, so that a set of indexes of the sequence of images in which each pixel of the target object in the input image is focused is obtained, and pixels of an input image in which each pixel in the sequence of images 1-k is focused are extracted (i.e., a pixel value of the pixel in row i and column j is extracted from the image 2 in the sequence of images 1-k, and a pixel value of the pixel in row i and column j+1 is extracted from the image k in the sequence of images 1-k) and are fused together, to generate a fused image in which each pixel of the target object is focused.

In the technical solution of the embodiments of the present application, the indexes of the sequence of input images in which each pixel point of the target object is focused are learned, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

According to some embodiments of the present application, optionally, step 105 further includes: setting a step size of a camera for acquiring the sequence of input images based on a number of frames of the sequence of input images and a size of the target object in the sequence of input images.

In some examples, such as in the case of using a CCD camera to acquire a sequence of images, a width L of a target object (such as a tab) can first be obtained through measurement (e.g., physical measurement by a mechanical device), and then a step size used by the CCD camera can be set based on a number k of frames of continuous photographing of the sequence of input images, for example, m=L/step.

The step size of the camera is set based on the size of the target object and the number of the frames of the sequence of input images, which can ensure that the acquired sequence of input images can cover all focused regions of the target object, thereby ensuring that each pixel of the target object in the fused image includes a focused portion.

Figure 2:
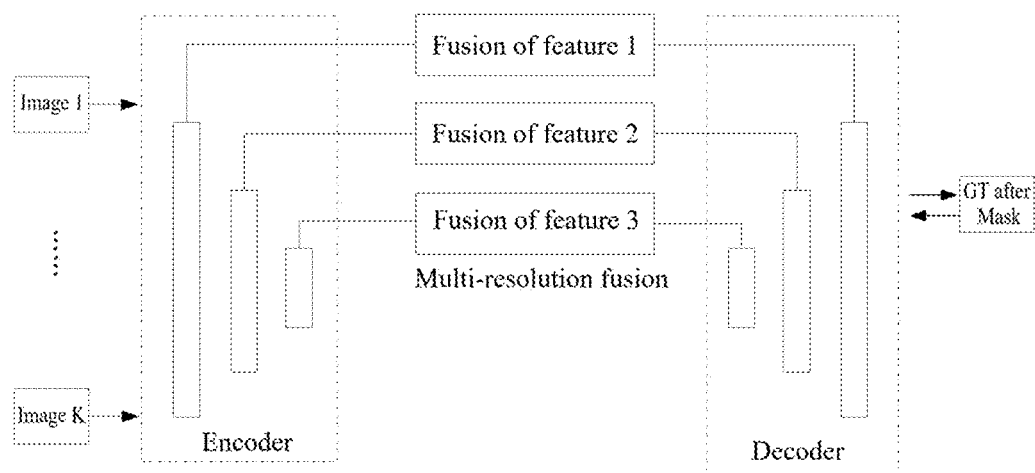
FIG. 2 is a functional block diagram of an image processing system according to some embodiments of the present application.
Figure 3:
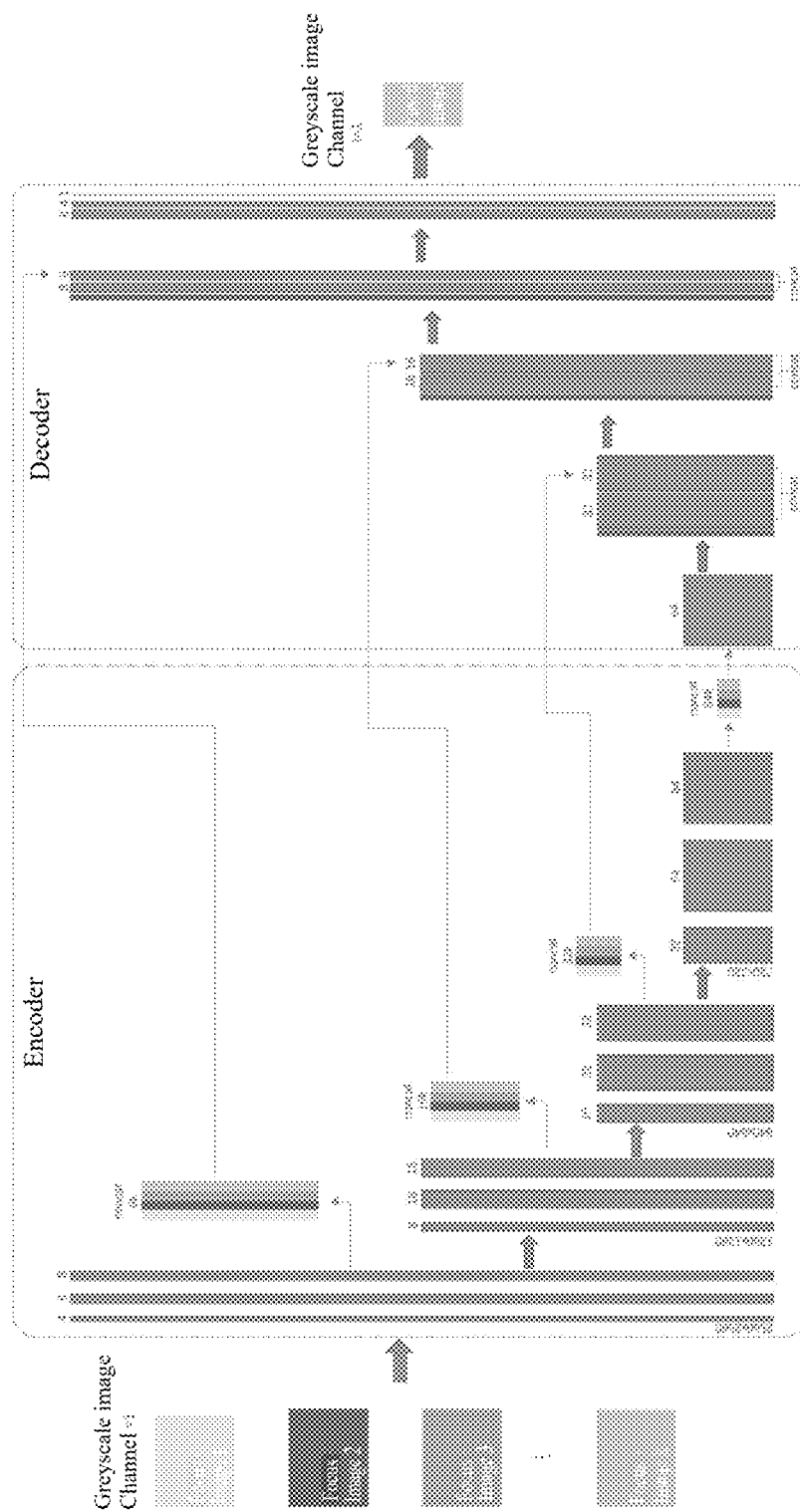
FIG. 3 is a structural block diagram of a fusion module according to some embodiments of the present application.

According to some embodiments of the present application, optionally, further referring to FIGS. 2 and 3, FIG. 2 is a structural block diagram of a fusion module according to some embodiments of the present application, and FIG. 3 is a schematic diagram of specific implementation of a fusion module according to some embodiments of the present application. The sequence of input images contains indexes, and step 110 further includes: extracting features of the sequence of input images; performing multi-resolution fusion on the extracted features, to obtain fused multi-resolution features; generating a predicted mask map based on the fused multi-resolution features, where each pixel of the predicted mask map indicates an index of an input image, and the index indicates an input image from which each pixel of the fused image originates; and generating the fused image based on the predicted mask map and the sequence of input images.

In some examples, assuming that the sequence of input images is a sequence of greyscale images with a resolution of 5120*5120*1 (including an image 1, an image 2, . . . , and an image k), extracting features of the sequence of input images may include inputting each input image separately into an encoder in the fusion module for executing a multi-resolution fusion algorithm, to obtain the multi-resolution features of the image, as shown in FIG. 2. In some examples, the basic structure of the encoder may include a convolution layer, a batch normalization layer, and a rectified linear unit (RLU) layer, as shown in FIG. 3. In some examples, performing multi-resolution fusion on the extracted features may include inputting multi-resolution features of each image in the sequence of input images 1-k into a fusion layer in the encoder module in the fusion module for performing the multi-resolution fusion algorithm, to perform concatenation or concat fusion on the features, as shown in FIG. 2. In some examples, generating a predicted mask map based on the fused multi-resolution features may include inputting the fused multi-resolution features into a decoder module in the fusion module for performing a multi-resolution fusion algorithm, to output the predicted mask map, where each pixel of the predicted mask map indicates an index of an input image in which the pixel is focused. For example, each pixel point in the predicted mask map has a value of 0, 1, . . . k (0 indicates background (not the target object), while 1, 2, . . . k represent the indexes of the sequence of images), as shown in FIG. 2. In some examples, the basic structure of the decoder may include a convolution layer, a batch normalization layer, a rectified linear unit layer, and a bilinear upsample layer, as shown in FIG. 3. In some examples, generating the fused image based on the predicted mask map and the sequence of input images may include: obtaining the fused image in which each pixel of the target object is focused, based on indexes of a sequence of images in which each pixel point indicates that each pixel of the target object is focused and a sequence of input images 1-k. For example, a pixel in row i and column j of the fused image includes a value of a corresponding pixel from the image 2, a pixel in row i and column j+1 of the fused image includes a value of a corresponding pixel from the image k, and so on.

By means of semantic segmentation, the images in which the target object is the clearest are found from a sequence of multi-frame images and then fused, so that a deep learning semantic segmentation neural network learns relative position information (i.e. the indexes of the sequence of input images) of each clear pixel point through internal convolution, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

According to some embodiments of the present application, optionally, the method further includes: applying a 2D fusion algorithm to the sequence of input images to generate an initial fused image; and receiving a ground truth annotation of the initial fused image to generate an annotated mask map, where the annotated mask map indicates whether one or more pixels of the target object in the initial fused image are focused.

In some examples, applying a 2D fusion algorithm to the sequence of input images to generate an initial fused image may include obtaining the initial fused image (such as an image k+1') of the sequence of input images (e.g., the image 1, the image 2, . . . , and the image k) by using an image fusion algorithm in the prior art. In some examples, receiving a ground truth annotation of the initial fused image to generate an annotated mask map may include receiving a ground truth (GT) annotation of the initial fused image (such as the image k+1') to generate an annotated mask, where the annotated mask map indicates whether each pixel of the target object in the initial fused image is focused. In some examples, each pixel of the annotated mask map can have a value of 0 or 1, where 1 indicates that the pixel is focused and 0 indicates that the pixel is not focused. In some examples, the annotated mask map has one or more pixels of the target object that are not focused removed from a data sample by means of masking, so that the data fed back to the multi-resolution fusion algorithm for performing multi-resolution fusion contains only ground truth annotations of the focused pixels.

The part of the initial fused image where the target object is still blurred (unfocused) is annotated and masked by means of semi-automatic annotation, and is then removed from a training sample set, to obtain a real training data set that contains only ground truth annotations of the focused pixels, such that a large amount of task-related training data can be rapidly generated, and a semantic segmentation model can be trained using real and valid production line data. In the solution of the present application, for different production lines, only some pieces of real and valid data need to be collected for fine-tuning training, and can then be mass-reproduced and spread to these different production lines, such that actual requirements can be covered and the technique is implemented into the practical application of the production lines.

According to some embodiments of the present application, optionally, the method further includes: calculating a loss rate between the predicted mask map and the annotated mask map; and feeding back the calculated loss rate to a multi-resolution fusion algorithm for performing the multi-resolution fusion.

In some examples, calculating a loss rate between the predicted mask map and the annotated mask map may include using one or both of the following MSE (a mean square error loss function) and SSIM (a structural similarity loss function):

$$MSE \text{ loss} = \frac{1}{mn}\sum_{i=0}^{m}\sum_{j=0}^{n}\left(Y_{ij}^{gt} - Y_{ij}^{pred}\right)^2 \quad (1)$$

where $Y_{ij}^{gt}$ represents a ground truth label value (a GT value in the annotated mask map) corresponding to a pixel value in row i and column j of an image, $Y_{ij}^{pred}$ represents a predicted label value (a value in the predicted mask map) corresponding to the pixel value in row i and column j of the image, and m*n represents an image resolution.

$$SSIM \text{ loss} = \sum_{patch} \frac{(2 + \mu_{pred}\mu_{gt} + C_1)\left(\frac{2}{N-1}\sum_{i=1}^{N}(pred_i - \mu_{pred})(gt_i - \mu_{gt})\right)}{(\mu_{pred}^2 + \mu_{gt}^2 + C_1)(\sigma_{pred}^2 + \sigma_{gt}^2 + C_2)} \quad (2)$$

where u represents an average value of all pixels of an image patch, and σ represents a pixel variance in the image patch. In some examples, the correction coefficients $C_1=(K_1 \times R)^2$, and $C_2=(K_2 \times R)^2$, where R is a dynamic range determined based on an image data type, and K is a weighting factor. In some examples, R has a value of 0 to 255 in a case where the image data type is unit8; and R has a value of −1 to 1 in a case where the data image type is a floating point. In some examples, values of $K_1$ and $K_2$ can be obtained according to a heuristic method. In some examples, $K_1$ can be set to 0.01, while $K_2$ can be set to 0.03. In some examples, the selection of an image patch can be implemented by using a sliding window method, such as by using a sliding window of a size of 11×11, as long as the side length of the sliding window is odd (to ensure that there is a center pixel). SSIM focuses on image similarity in three aspects of: image luminance (such as an average value and greyscale value of an image patch), image contrast (such as an image patch variance), and an image structure ratio (such as a normalized pixel vector). In some examples, either or both of the MSE and SSIM loss functions can be used to measure the similarity between the fused image (predicted mask map) and the sequence of input images (annotated mask map), so as to achieve fitting regression in training.

The loss rate between the predicted mask map and/or fused image output by the multi-resolution fusion algorithm and the mask map annotated by ground truth reflects a similarity between the predicted mask map and/or fused image output by the multi-resolution fusion algorithm and an original input image. The loss rate is fed back to the multi-resolution fusion algorithm, and supervised learning training is performed on the output of the multi-resolution fusion algorithm based on the loss rate together with the mask map annotated by ground truth, such that the accuracy of the multi-resolution fusion algorithm in terms of generating a fused image in which all target objects are clear is improved through continuous training and learning while achieving fitting regression in training.

According to some embodiments of the present application, optionally, the method further includes: updating the multi-resolution fusion algorithm for performing the multi-resolution fusion based on the loss rate, or the annotated mask map, or a combination of the two.

The calculated loss rate is fed back to the multi-resolution fusion algorithm along with the mask map annotated by ground truth, and supervised learning training is performed on the output of the multi-resolution fusion algorithm, such that the accuracy of the multi-resolution fusion algorithm in terms of generating a fused image in which all target objects are clear is improved through continuous training and learning while achieving fitting regression in training.

According to some embodiments of the present application, referring to FIGS. 1 to 3, the present application provides an image processing method, including: acquiring a sequence of input images containing a tab, the sequence of input images containing indexes 1 . . . k, where a step size used by a CCD camera to acquire the sequence of input images is set based on a measured width L of the tab and a number k of frames of continuous photographing of the sequence of input images, that is, m=L/step; applying a 2D fusion algorithm to the sequence of input images to generate an initial fused image; receiving a ground truth annotation of the initial fused image to generate an annotated mask map, where the annotated mask map indicates whether one or more pixels of the tab in the initial fused image are focused; extracting depth features of the sequence of input images; performing multi-resolution fusion on the extracted depth features, to obtain fused multi-resolution features; generating a predicted mask map based on the fused multi-resolution features, where each pixel of the predicted mask map indicates an index of an input image, and the index indicates an input image from which each pixel of the fused image originates; generating a single fused image based on the predicted mask map and the sequence of input images, where pixels of the fused image include a pixel at a corresponding position of an input image in the sequence of input images, and each pixel of the fused image containing the tab includes a pixel at a corresponding position of an input image in the sequence of input images in which part of the tab is focused; calculating a loss rate between the predicted mask map and the annotated mask map by using MSE and SSIM loss functions, where $$MSE \text{ loss} = \frac{1}{mn}\sum_{i=0}^{m}\sum_{j=0}^{n}\left(Y_{ij}^{gt} - Y_{ij}^{pred}\right)^2,$$

where $Y_{ij}^{gt}$ represents a ground truth label value (a GT value in the annotated mask map) corresponding to a pixel value in row i and column j of an image, $Y_{ij}^{pred}$ represents a predicted label value (a value in the predicted mask map)

corresponding to the pixel value in row i and column j of the image, and m*n represents an image resolution, and where $$SSIM\ loss = \sum_{patch} \frac{(2 + \mu_{pred}\mu_{gt} + C_1)\left(\frac{2}{N-1}\sum_{i=1}^{N}(pred_i - \mu_{pred})(gt_i - \mu_{gt})\right)}{(\mu_{pred}^2 + \mu_{gt}^2 + C_1)(\sigma_{pred}^2 + \sigma_{gt}^2 + C_2)},$$

where an image patch is selected according to a sliding window size of 11×11, u represents an average value of all pixels of the image patch, σ represents a pixel variance in the image patch, $C_1=(K_1\times R)^2$, $C_2=(K_2\times R)^2$, R has a value of 0 to 255, $K_1=0.01$, and $K_2=0.03$; feeding back the calculated loss rate to a multi-resolution fusion algorithm for performing the multi-resolution fusion; and updating the multi-resolution fusion algorithm for performing the multi-resolution fusion based on the loss rate, or the annotated mask map, or a combination of the two.

Figure 4:
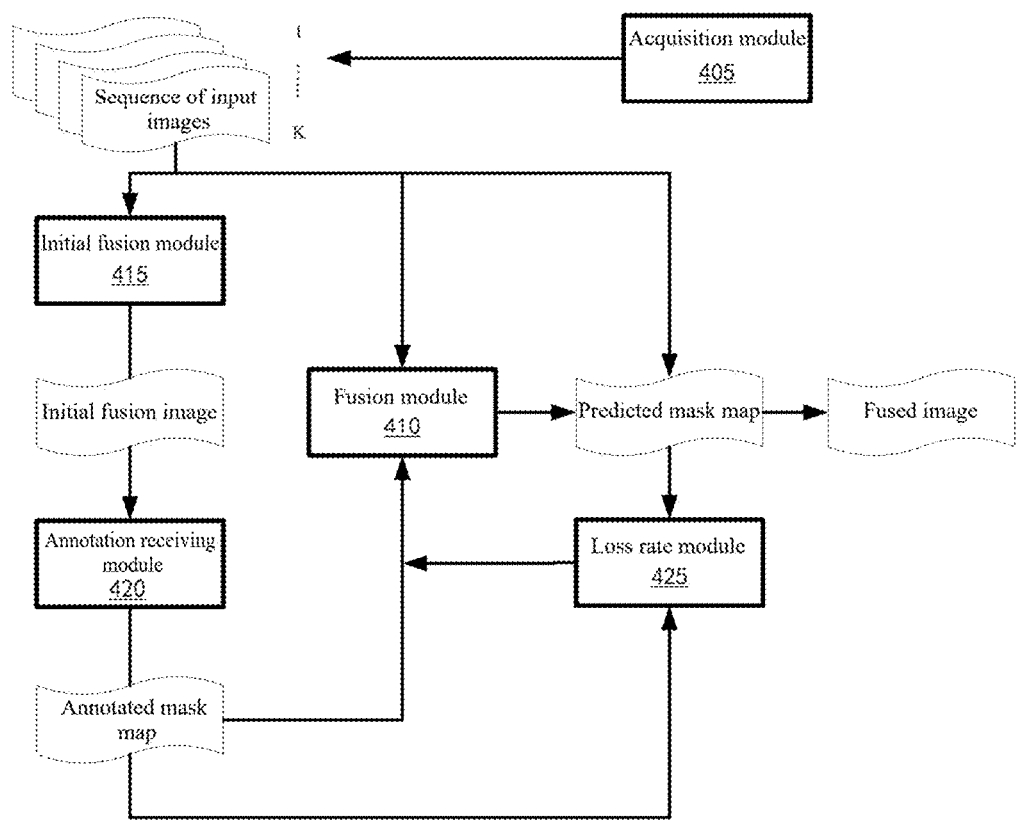
FIG. 4 is a schematic diagram of specific implementation of a fusion module according to some embodiments of the present application.

Referring to FIG. 4, FIG. 4 is a functional block diagram of an image processing system according to some embodiments of the present application. The present application provides an image processing system. In FIG. 4, the bold rectangular boxes represent logic modules configured to perform operations described above, and the flag-shaped box represents an output from preceding logic modules. In FIG. 4, the arrows indicate the logical sequence and direction of all operations described above. As shown in FIG. 4, the system includes: an acquisition module 405 configured to acquire a sequence of input images containing a target object; and a fusion module 410 configured to perform multi-resolution fusion on the sequence of input images to generate a single fused image, where pixels of the fused image include a pixel at a corresponding position of an input image in the sequence of input images, and each pixel of the fused image containing the target object includes a pixel at a corresponding position of an input image in the sequence of input images in which part of the target object is focused.

In the technical solution of the embodiments of the present application, the indexes of the sequence of input images in which each pixel point of the target object is focused are learned, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

According to some embodiments of the present application, optionally, the acquisition module 405 is further configured to set a step size of a camera for acquiring the sequence of input images based on a number of frames of the sequence of input images and a size of the target object in the sequence of input images.

The step size of the camera is set based on the size of the target object and the number of the frames of the sequence of input images, which can ensure that the acquired sequence of input images can cover all focused regions of the target object, thereby ensuring that each pixel of the target object in the fused image includes a focused portion.

According to some embodiments of the present application, optionally, further referring to FIGS. 2 and 3, FIG. 2 is a structural block diagram of a fusion module according to some embodiments of the present application, and FIG. 3 is a schematic diagram of specific implementation of a fusion module according to some embodiments of the present application. The sequence of input images contains indexes, and the fusion module 410 further includes: an encoder configured to: extract features of the sequence of input images; and perform multi-resolution fusion on the extracted features, to obtain fused multi-resolution features; and a decoder configured to: generate a predicted mask map based on the fused multi-resolution features, where each pixel of the predicted mask map indicates an index of an input image, and the index indicates an input image from which each pixel of the fused image originates.

By means of semantic segmentation, the images in which the target object is the clearest are found from a sequence of multi-frame images and then fused, so that a deep learning semantic segmentation neural network learns relative position information (i.e. the indexes of the sequence of input images) of each clear pixel point through internal convolution, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

According to some embodiments of the present application, optionally, the fusion module 410 is further configured to generate the fused image based on the predicted mask map and the sequence of input images.

By means of semantic segmentation, the images in which the target object is the clearest are found from a sequence of multi-frame images and then fused, so that a deep learning semantic segmentation neural network learns relative position information (i.e. the indexes of the sequence of input images) of each clear pixel point through internal convolution, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

According to some embodiments of the present application, optionally, the system further includes: an initial fusion module 415 configured to apply a 2D fusion algorithm to the sequence of input images to generate an initial fused image; and an annotation receiving module 420 configured to receive a ground truth annotation of the initial fused image to generate an annotated mask map, where the annotated mask map indicates whether one or more pixels of the target object in the initial fused image are focused.

The part of the initial fused image where the target object is still blurred (unfocused) is annotated and masked by means of semi-automatic annotation, and is then removed from a training sample set, to obtain a real training data set that contains only ground truth annotations of the focused pixels, such that a large amount of task-related training data can be rapidly generated, and a semantic segmentation model can be trained using real and valid production line data. In the solution of the present application, for different production lines, only some pieces of real and valid data need to be collected for fine-tuning training, and can then be mass-reproduced and spread to these different production lines, such that actual requirements can be covered and the technique is implemented into the practical application of the production lines.

According to some embodiments of the present application, optionally, the system further includes: a loss rate module 425 configured to: calculate a loss rate between the predicted mask map and the annotated mask map; and feed back the calculated loss rate to the fusion module.

The loss rate between the predicted mask map and/or fused image output by the multi-resolution fusion algorithm and the mask map annotated by ground truth reflects a similarity between the predicted mask map and/or fused image output by the multi-resolution fusion algorithm and an original input image. The loss rate is fed back to the multi-resolution fusion algorithm, and supervised learning training is performed on the output of the multi-resolution fusion algorithm based on the loss rate together with the mask map annotated by ground truth, such that the accuracy of the multi-resolution fusion algorithm in terms of generating a fused image in which all target objects are clear is improved through continuous training and learning while achieving fitting regression in training.

According to some embodiments of the present application, optionally, the fusion module 410 is further configured to update the fusion module based on the loss rate, or the annotated mask map, or a combination of the two.

The calculated loss rate is fed back to the multi-resolution fusion algorithm along with the mask map annotated by ground truth, and supervised learning training is performed on the output of the multi-resolution fusion algorithm, such that the accuracy of the multi-resolution fusion algorithm in terms of generating a fused image in which all target objects are clear is improved through continuous training and learning while achieving fitting regression in training.

According to some embodiments of the present application, referring to FIGS. 2 to 4, the present application provides an image processing system, including: an acquisition module 405 configured to acquire a sequence of input images containing a tab, the sequence of input images containing indexes 1 . . . k, where a step size used by a CCD camera to acquire the sequence of input images is set based on a measured width L of the tab and a number k of frames of continuous photographing of the sequence of input images, that is, m=L/step; and a fusion module 410, including:
       an encoder configured to: extract depth features of the sequence of input images; and perform multi-resolution fusion on the extracted depth features, to obtain fused multi-resolution features;
       and a decoder configured to generate a predicted mask map based on the fused multi-resolution features, where each pixel of the predicted mask map indicates an index of an input image, and the index indicates an input image from which each pixel of the fused image originates.

The fusion module 410 is further configured to: generate the fused image based on the predicted mask map and the sequence of input images, where pixels of the fused image include a pixel at a corresponding position of an input image in the sequence of input images, and each pixel of the fused image containing the tab includes a pixel at a corresponding position of an input image in the sequence of input images in which part of the tab is focused; and update the multi-resolution fusion algorithm for performing the multi-resolution fusion based on the loss rate, or the annotated mask map, or a combination of the two.

The system further includes: an initial fusion module 415 configured to apply a 2D fusion algorithm to the sequence of input images to generate an initial fused image;

an annotation receiving module 420 configured to receive a ground truth annotation of the initial fused image to generate an annotated mask map, where the annotated mask map indicates whether one or more pixels of the tab in the initial fused image are focused; and a loss rate module 425 configured to: calculate a loss rate between the predicted mask map and the annotated mask map by using MSE and SSIM loss functions, where $$MSE \text{ loss} = \frac{1}{mn}\sum_{i=0}^{m}\sum_{j=0}^{n}(Y_{ij}^{gt} - Y_{ij}^{pred})^2,$$

where $Y_{ij}^{gt}$ represents a ground truth label value (a GT value in the annotated mask map) corresponding to a pixel value in row i and column j of an image, $Y_{ij}^{pred}$ represents a predicted label value (a value in the predicted mask map) corresponding to the pixel value in row i and column j of the image, and m*n represents an image resolution, and where $$SSIM \text{ loss} = \sum_{patch} \frac{(2+\mu_{pred}\mu_{gt}+C_1)\left(\frac{2}{N-1}\sum_{i=1}^{N}(pred_i - \mu_{pred})(gt_i - \mu_{gt})\right)}{(\mu_{pred}^2 + \mu_{gt}^2 + C_1)(\sigma_{pred}^2 + \sigma_{gt}^2 + C_2)},$$

where an image patch is selected according to a sliding window size of 11×11, u represents an average value of all pixels of the image patch, σ represents a pixel variance in the image patch, $C_1=(K_1 \times R)^2$, $C_2=(K_2 \times R)^2$, R has a value of 0 to 255, $K_1=0.01$, and $K_2=0.03$; and feed back the calculated loss rate to the fusion module.

Figure 5:
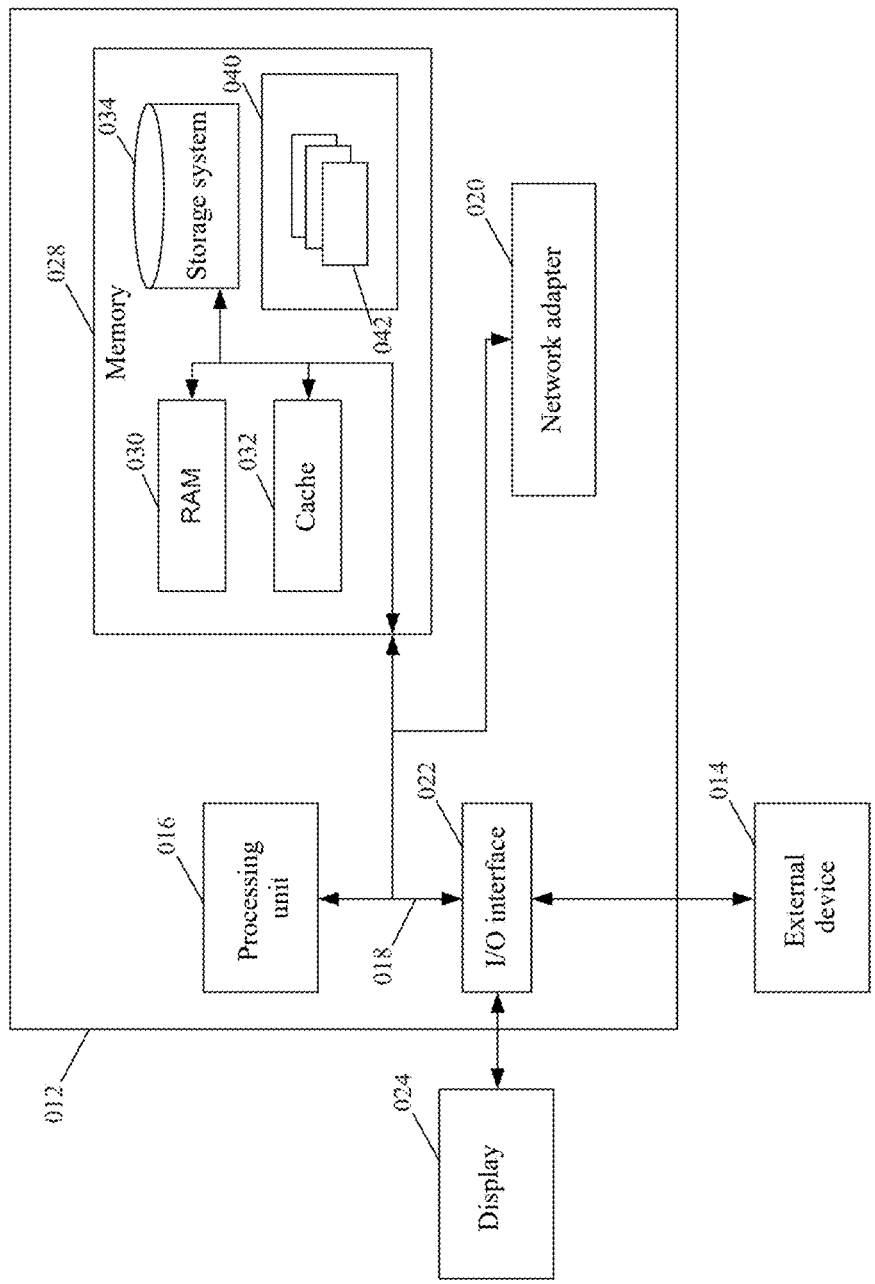
FIG. 5 is a structural block diagram of a computer system, which is adapted to implement an image processing system according to some embodiments of the present application.

Referring to FIG. 5, FIG. 5 is a structural block diagram of a computer system, which is adapted to implement an image processing system according to some embodiments of the present application. As shown in FIG. 5, the system includes: a memory 028 having computer-executable instructions stored thereon; and a processor 016 coupled to the memory 028, where the computer-executable instructions cause the system to perform the following operations when executed by the processor 016: acquiring a sequence of input images containing a target object; and performing multi-resolution fusion on the sequence of input images to generate a single fused image, where pixels of the fused image include a pixel at a corresponding position of an input image in the sequence of input images, and each pixel of the fused image containing the target object includes a pixel at a corresponding position of an input image in the sequence of input images in which part of the target object is focused.

In some examples, FIG. 5 is a block diagram of an exemplary computer system 012 that can be adapted to implement an embodiment of the present disclosure. The computer system 012 shown in FIG. 5 is merely an example, and shall not impose any limitation on the function and scope of use of the embodiments of the present disclosure.

As shown in FIG. 5, the computer system 012 is embodied in the form of a general-purpose computing device. The components of the computer system 012 may include, but are not limited to: one or more of a processor or processing unit 016, a system memory 028, and a bus 018 for connecting different system components (including the system memory 028 and the processing unit 016).

The bus 018 represent one or more of several types of bus structures, including a memory bus or memory controller, a peripheral bus, a graphics acceleration port, a processor, or a local area bus using any of a variety of bus structures. For example, these structures include, but are not limited to, an industry standard architecture (ISA) bus, a micro channel architecture (MAC) bus, an enhanced ISA bus, a video electronics standards association (VESA) local bus, and a peripheral component interconnect (PCI) bus.

The computer system 012 typically includes a variety of computer system-readable media. These media may be any available media that can be accessed by the computer system 012, including volatile and non-volatile media, and removable and non-removable media.

The system memory 028 may include a computer system-readable medium in the form of a volatile memory, such as a random access memory (RAM) 030 and/or a cache 032. The computer system 012 may further include other removable/non-removable, and volatile/non-volatile computer system storage media. By way of example only, a storage system 034 may be used for reading and writing of a non-removable, and non-volatile magnetic medium (not shown in FIG. 5, commonly referred to as a "hard disk drive"). Although not shown in FIG. 5, a disk drive for reading from and writing to a removable non-volatile disk (e.g., a "floppy disk") and an optical disk drive for reading from and writing to a removable and non-volatile optical disk (e.g., a CD-ROM, a DVD-ROM, or other optical media) may be provided. In these cases, each drive can be connected to the bus 018 via one or more data medium interfaces. The memory 028 may include at least one program product having a set (e.g., at least one) of program modules, where these program modules are configured to perform the functions of the embodiments of the present disclosure.

A program/utility tool 040 having a set (at least one) of program modules 042 may be stored, for example, in the memory 028, such program module 042 including, but not limited to an operating system, one or more application programs, other program modules, and program data. Each one or a combination of these examples may include the implementation of a network environment. The program module 042 generally performs the functions and/or methods in the embodiments described in the present disclosure.

The computer system 012 may alternatively communicate with one or more external devices 014 (e.g., a keyboard, a pointing device, a display 024, etc.). In the present disclosure, the computer system 012 communicates with an external radar device, and may alternatively communicate with one or more devices that enable a user to interact with the computer system 012, and/or communicate with any device (e.g., a network interface card, a modem, etc.) that enables the computer system 012 to communicate with one or more other computing devices. The communication may be performed via an input/output (I/O) interface 022. In addition, the computer system 012 may alternatively communicate with one or more networks (e.g., a local area network (LAN), a wide area network (WAN), and/or a public network, such as the Internet) via a network adapter 020. As shown, the network adapter 020 communicates with other modules of the computer system 012 via the bus 018. It should be understood that, although not shown in FIG. 7, other hardware and/or software modules may be used in conjunction with the computer system 012, including but not limited to: microcodes, a device driver, a redundant processing unit, an external disk drive array, an RAID system, a tape drive, a data backup storage system, etc.

The processing unit 016 executes various functional applications and data processing, that is, implements the method flow provided in the embodiments of the present disclosure, by running programs stored in the system memory 028.

The above computer program may be provided in a computer storage medium, that is, the computer storage medium is encoded with a computer program, where when executed by one or more computers, the program causes the one or more computers to perform the method flow and/or apparatus operations shown in the above embodiments of the present disclosure. For example, the program is executed by the one or more processors to perform the method flow provided in the embodiments of the present disclosure.

With the development of technology over time, a medium has an increasingly boarder meaning, and a computer program may be propagated by means of, without limitation, a tangible medium, and may alternatively be downloaded directly from a network, etc. The computer program may be a computer-readable medium or any combination of multiple computer-readable media.

The computer-readable medium may be a computer-readable signal medium or a computer-readable storage medium. The computer-readable storage medium may, for example, include, but is not limited to, an electronic, magnetic, optical, electromagnetic, infrared, or semiconductor system, apparatus, or device, or any combination thereof. More specific examples of the computer-readable storage media (a non-exhaustive list) include: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this document, the computer-readable storage medium may be any tangible medium containing or storing a program which may be used by or in combination with an instruction execution system, apparatus, or device.

The computer-readable signal medium may include a data signal propagated in a baseband or as a part of a carrier, the data signal carrying computer-readable program codes. Such propagated data signal may be in various forms, including but not limited to an electromagnetic signal, an optical signal, or any suitable combination thereof. The computer-readable signal medium may also be any computer-readable medium other than the computer-readable storage medium. The computer-readable medium can send, propagate, or transmit a program used by or in combination with an instruction execution system, apparatus, or device.

The program codes contained in the computer-readable medium may be transmitted by any appropriate medium, including but not limited to radio, electric wires, optical cables, RF, etc., or any suitable combination thereof.

Computer program codes for performing operations of the present disclosure can be written in one or more programming languages or a combination thereof, where the programming languages include object-oriented programming languages, such as Java, Smalltalk, and C++, and further include conventional procedural programming languages, such as "C" language or similar programming languages. The program codes may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or wide area network (WAN), or may be connected to an external computer (for example, connected over the Internet using an Internet service provider).

In the technical solution of the embodiments of the present application, the indexes of the sequence of input images in which each pixel point of the target object is focused are learned, and images corresponding to the clearest target object are extracted from the sequence of input images and then subjected to pixel-level fusion, so that a sequence of images with different focused regions in the same scene are fused into a single image in which all target objects are clear, thereby achieving an all-in-focus fused image of pixel-level precision that has detailed information of the target object preserved, and effectively improving the utilization rate of image information.

Finally, it should be noted that, the above embodiments are merely used for illustrating rather than limiting the technical solution of the present application. Although the present application has been illustrated in detail with reference to the foregoing embodiments, it should be understood by those of ordinary skill in the art that the technical solutions recorded in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. An image processing method, comprising:
   acquiring a sequence of input images containing a target object;
   performing multi-resolution fusion on the sequence of input images to generate a single fused image, wherein pixels of the fused image comprise a pixel at a corresponding position of an input image in the sequence of input images, and each pixel of the fused image containing the target object comprises a pixel at a corresponding position of an input image in the sequence of input images in which part of the target object is focused;
   applying a 2D fusion algorithm to the sequence of input images to generate an initial fused image; and
   receiving a ground truth annotation of the initial fused image to generate an annotated mask map, wherein the annotated mask map indicates whether one or more pixels of the tartlet object in the initial fused image are focused.

2. The method of claim 1, wherein the acquiring a sequence of input images further comprises:
   setting a step size of a camera for acquiring the sequence of input images based on a number of frames of the sequence of input images and a size of the target object in the sequence of input images.

3. The method of claim 1, wherein the sequence of input images contains indexes, and the performing multi-resolution fusion on the sequence of input images to generate a fused image further comprises:
   extracting features of the sequence of input images;
   performing multi-resolution fusion on the extracted features, to obtain fused multi-resolution features;
   generating a predicted mask map based on the fused multi-resolution features, wherein each pixel of the predicted mask map indicates an index of an input image, and the index indicates an input image from which each pixel of the fused image originates; and
   generating the fused image based on the predicted mask map and the sequence of input images.

4. A non-transitory computer readable storage medium including instructions stored thereon which, when executed by at least one processor, cause the at least one processor to perform the image processing method of claim 1.

5. The method of claim 1, further comprising:
   calculating a loss rate between the predicted mask map and the annotated mask map; and
   feeding back the calculated loss rate to a multi-resolution fusion algorithm for performing the multi-resolution fusion.

6. The method of claim 5, further comprising:
   updating the multi-resolution fusion algorithm for performing the multi-resolution fusion based on the loss rate, or the annotated mask map, or a combination of the two.

7. An image processing system, comprising:
   an acquirer to acquire a sequence of input images containing a target object;
   a fusion circuitry to perform multi-resolution fusion on the sequence of input images to generate a single fused image, wherein pixels of the fused image comprise a pixel at a corresponding position of an input image in the sequence of input images, and each pixel of the fused image containing the target object comprises a pixel at a corresponding position of an input image in the sequence of input images in which part of the target object is focused;
   an initial fusion circuitry to apply a 2D fusion algorithm to the sequence of input images to generate an initial fused image; and
   an annotation receiving circuitry to receive a ground truth annotation of the initial fused image to generate an annotated mask map, wherein the annotated mask map indicates whether one or more pixels of the target object in the initial fused image are focused.

8. The system of claim 7, wherein the acquirer is further configured to set a step size of a camera for acquiring the sequence of input images based on a number of frames of the sequence of input images and a size of the target object in the sequence of input images.

9. The system of claim 7, wherein the sequence of input images contains indexes, and the fusion circuitry further comprises:
   an encoder configured to:
     extract features of the sequence of input images; and
     perform multi-resolution fusion on the extracted features, to obtain fused multi-resolution features; and
   a decoder configured to:
     generate a predicted mask map based on the fused multi-resolution features, wherein each pixel of the predicted mask map indicates an index of an input image, and the index indicates an input image from which each pixel of the fused image originates.

10. The system of claim 9, wherein the fusion circuitry is further configured to generate the fused image based on the predicted mask map and the sequence of input images.

11. The system of claim 7, further comprising:
a loss rate circuitry to:
calculate a loss rate between the predicted mask map and the annotated mask map; and
feed back the calculated loss rate to the fusion circuitry.

12. The system of claim 11, wherein the fusion circuitry is further configured to update the multi-resolution fusion algorithm for performing the multi-resolution fusion based on the loss rate, or the annotated mask map, or a combination of the two.

13. An image processing system, comprising:
a memory having computer-executable instructions stored thereon; and
a processor coupled to the memory, wherein the computer-executable instructions cause the system to perform the following operations when executed by the processor:
acquiring a sequence of input images containing a target object;
performing multi-resolution fusion on the sequence of input images to generate a single fused image, wherein pixels of the fused image comprise a pixel at a corresponding position of an input image in the sequence of input images, and each pixel of the fused image containing the target object comprises a pixel at a corresponding position of an input image in the sequence of input images in which part of the target object is focused;
applying a 2D fusion algorithm to the sequence of input images to generate an initial fused image; and
receiving a ground truth annotation of the initial fused image to generate an annotated mask map, wherein the annotated mask map indicates whether one or more pixels of the target object in the initial fused image are focused.

* * * * *